US011343450B1

(12) United States Patent
Hasegawa

(10) Patent No.: US 11,343,450 B1
(45) Date of Patent: May 24, 2022

(54) DARK CURRENT/WHITE PIXEL DEVICES AND METHODS FOR LATERAL OVERFLOW IMAGE SENSORS

(71) Applicant: OMNIVISION TECHNOLOGIES, INC., Santa Clara, CA (US)

(72) Inventor: Takuma Hasegawa, Kawasaki (JP)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 17/308,598

(22) Filed: May 5, 2021

(51) Int. Cl.
H04N 5/361 (2011.01)
H04N 5/351 (2011.01)
H04N 5/3745 (2011.01)
H04N 5/378 (2011.01)

(52) U.S. Cl.
CPC ............. H04N 5/361 (2013.01); H04N 5/351 (2013.01); H04N 5/378 (2013.01); H04N 5/37452 (2013.01)

(58) Field of Classification Search
CPC .... H04N 5/37452; H04N 5/351; H04N 5/361; H04N 5/378; H04N 5/355; H04N 5/3594
See application file for complete search history.

(56) References Cited

U.S. PATENT DOCUMENTS

| | | | |
|---|---|---|---|
| 6,649,950 B2 | 11/2003 | He et al. | |
| 7,105,878 B2 | 9/2006 | He et al. | |
| 7,368,772 B2 | 5/2008 | He et al. | |
| 10,079,261 B1 | 9/2018 | Wang et al. | |
| 10,103,193 B1 | 10/2018 | Manabe et al. | |
| 10,750,108 B2 | 8/2020 | Mikes | |
| 2021/0144319 A1* | 5/2021 | Innocent | H04N 5/3559 |

OTHER PUBLICATIONS

Iida, S., et al., "A 0.68e-rms Random-Noise 121dB Dynamic-Range Sub-pixel architecture CMOS Image Sensor with LED Flicker Mitigation," San Francisco, CA, Dec. 1-5, 2018, 2018 IEEE International Electron Devices Meeting (IEDM), pp. 221-224.

* cited by examiner

*Primary Examiner* — Nicholas G Giles

(74) *Attorney, Agent, or Firm* — Christensen O'Connor Johnson Kindness PLLC

(57) ABSTRACT

Image sensors having reduced dark current and white pixel are disclosed herein. In one embodiment, each pixel of the image sensor includes a photodiode (PD), a first floating diffusion (FD1) coupled to the photodiode through a transfer (TX) transistor, a second floating diffusion (FD2) coupled to the FD1 through a dual floating diffusion (DFD) transistor, and a lateral overflow integrating capacitor (LOFIC) coupled between the FD2 and a variable reference voltage (VCAP). A method for a correlated double sampling (CDS) readout includes: exposing a photodiode (PD) to light during an exposure period and increasing a capacitance of the LOFIC by setting the VCAP to a high voltage (H) level during an integration period of the exposure period.

14 Claims, 6 Drawing Sheets

DARK CURRENT/WHITE PIXEL DEVICES AND METHODS FOR LATERAL OVERFLOW IMAGE SENSORS

BACKGROUND INFORMATION

Field of the Disclosure

This disclosure relates generally to image sensors, and particularly but not exclusively, relates to pixel cells having an improved dark current and white pixel performance.

Background

CMOS image sensors (CIS) have become ubiquitous. They are widely used in digital still cameras, cellular phones, security cameras, as well as medical, automobile, and other applications. Image sensor operates in response to image light coming from an external scene and being incident upon the image sensor. An image sensor includes an array of pixels having photosensitive elements (e.g., photodiodes) that absorb a portion of the incident image light and in response generate corresponding electrical charge. The electrical charge of individual pixels may be measured as an output voltage of each photosensitive element. In general, the output voltage varies as a function of the intensity and duration of the incident light. The output voltage of individual photosensitive elements is used to produce a digital image (i.e., image data) representing an external scene.

Image sensor technology has continued to advance at a great pace. The demands of higher resolution and lower power consumption have encouraged further miniaturization and integration of these devices having high dynamic range and low light sensitivity. As a result, the pixel cells become susceptible to dark currents (i.e., electrical currents that exist in absence of the excitation light or in presence of very low levels of the excitation light) and white pixels (i.e., occurrence of the pixels that are saturated or close to being saturated). Therefore, systems and methods are needed for improved handling of dark current and white pixels.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
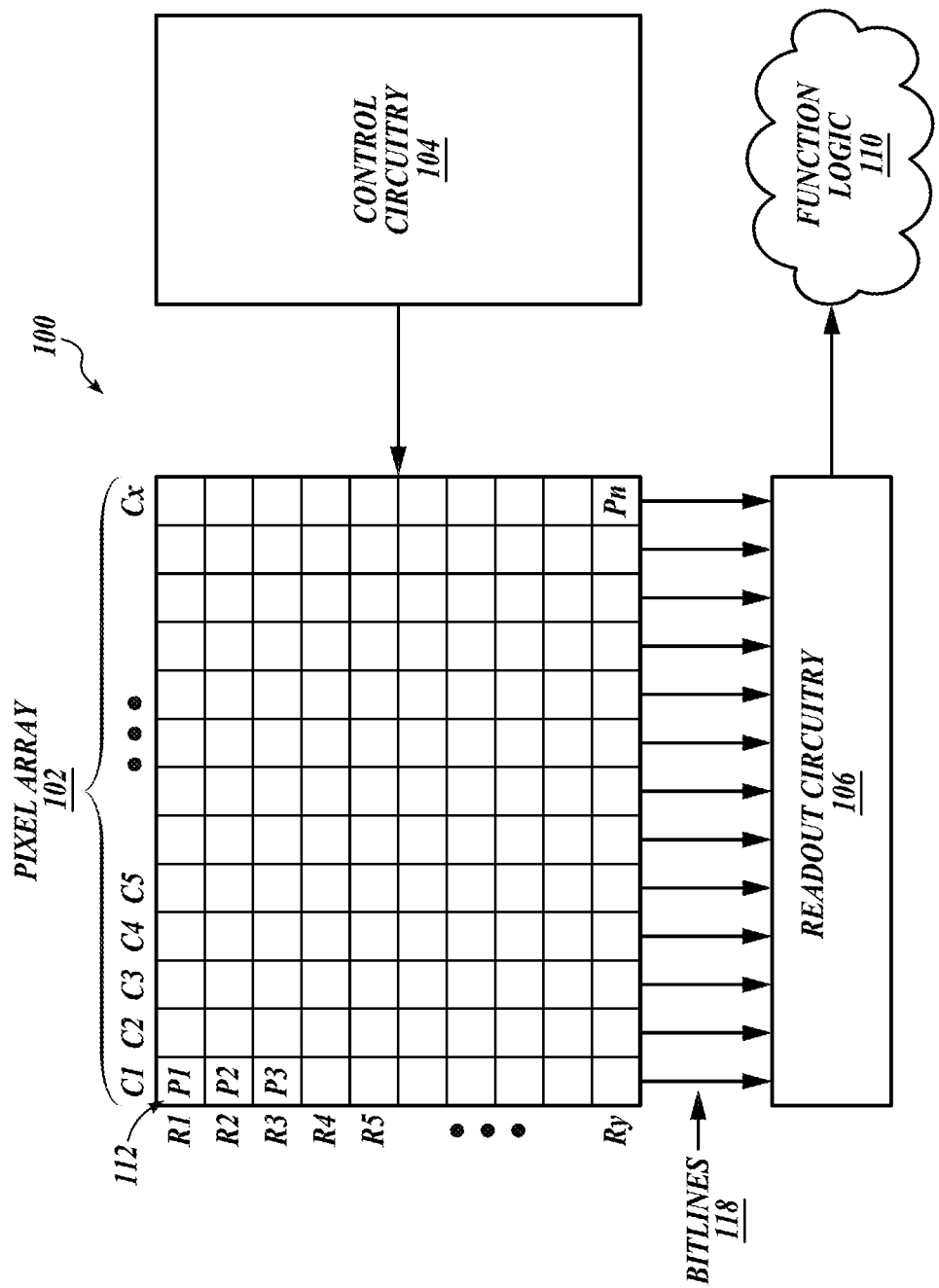
FIG. 1 illustrates an imaging system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Apparatuses and methods directed to improved handling of dark currents and white pixels in an image sensor are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Briefly, examples in accordance with the teachings of the present invention are directed to reducing dark current (DC) and white pixels (WP). In some embodiments, during the integration period a floating diffusion responsible for the low conversion gain (LCG) is connected to a relatively high voltage to increase its capacity (also referred as a full well capacity or FWC). In general, impact of the dark current and white pixel is less pronounced at the LCG floating diffusion, because RST gate to FD2 or DFD gate to FD2 voltage difference is smaller than TX gate to FD1 voltage difference. Conversely, voltage at a floating diffusion responsible for the high conversion gain (HCG) is kept at a relatively low voltage to reduce the DC and WP at this floating diffusion (also referred to as FD1). In some embodiments, a low leakage transistor, is used for both RST and DFD transistors to suppress dark current and white pixel issues at the FD2 node. Upon completion of the integration period and before the HCG and LCG readouts, FD1 and FD2 voltages may be adjusted to the same level to align their reset levels by using specific timing operations.

FIG. 1 illustrates an example imaging system 100 in accordance with an embodiment of the present disclosure. The imaging system 100 includes a pixel array 102, a control circuitry 104, a readout circuitry 106 and a function logic 110. In one example, the pixel array 102 is a two-dimensional (2D) array of photodiodes or image sensor pixels 112 (e.g., pixels P1, P2 . . . Pn). As illustrated, the photodiodes are arranged into rows (e.g., rows R1 to Ry) and columns (e.g., column C1 to Cx). In operation, the photodiodes acquire image data of an outside scene, which can then be used to render a 2D image of the person, place, object, etc. However, in other embodiments the photodiodes may be arranged into configurations other than rows and columns.

In an embodiment, after each pixel 112 in the pixel array 102 acquires its image charge, the image data is read out by the readout circuitry 106 via bitlines 118, and then transferred to a function logic 110. In various embodiments, the readout circuitry 106 may include signal amplifiers, analog-to-digital (ADC) conversion circuitry and data transmission circuitry. The function logic 110 may store the image data or even manipulate the image data by applying post image effects (e.g., crop, rotate, remove red eye, adjust brightness, adjust contrast, or otherwise). In some embodiments, the control circuitry 104 and function logic 110 may be combined into a single functional block to control the capture of images by the pixels 112 and the readout of image data from the readout circuitry 106. The function logic 110 may be a digital processor, for example. In one embodiment, the readout circuitry 106 may read one row of image data at a time along readout column lines (bitlines 118) or may read the image data using a variety of other techniques, such as a serial readout or a full parallel readout of all pixels simultaneously (not illustrated).

In one embodiment, the control circuitry 104 is coupled to the pixel array 102 to control operation of the plurality of photodiodes in the pixel array 102. For example, the control circuitry 104 may generate a shutter signal for controlling image acquisition. In one embodiment, the shutter signal is a global shutter signal for simultaneously enabling all pixels within the pixel array 102 to simultaneously capture their respective image data during a single data acquisition window. In another embodiment, the shutter signal is a rolling shutter signal such that each row, column, or group of pixels is sequentially enabled during consecutive acquisition windows. In another embodiment, image acquisition is synchronized with lighting effects such as a flash.

In one embodiment, readout circuitry 106 includes analog-to-digital converters (ADCs), which convert analog image data received from the pixel array 102 into a digital representation. The digital representation of the image data may be provided to the function logic 110. In some embodiments, the data transmission circuitry 108 may receive the digital representations of the image data from the ADCs in parallel and may provide the image data to the function logic 110 in series.

In different embodiments, imaging system 100 may be included into a digital camera, cell phone, laptop computer, or the like. Additionally, imaging system 100 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 100, extract image data from imaging system 100, or manipulate image data supplied by imaging system 100.

Figure 2:
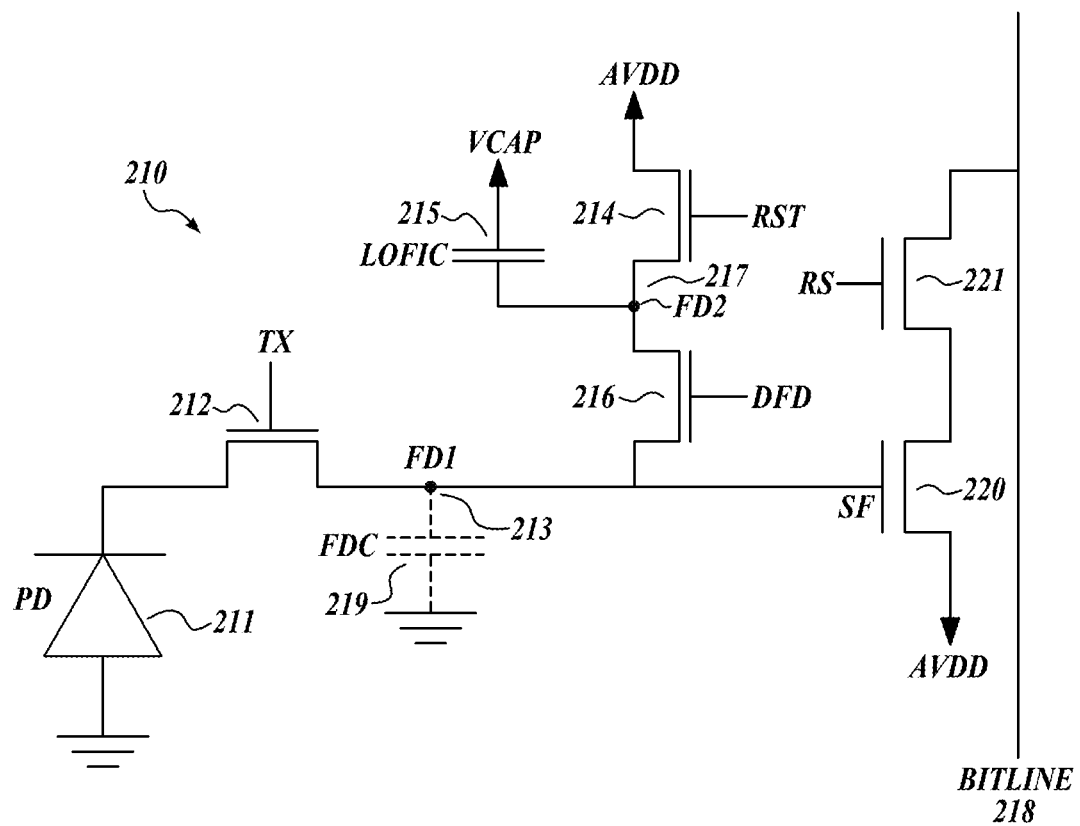
FIG. 2 is an illustrative schematic of a pixel in accordance with an embodiment of the present disclosure.

FIG. 2 is an illustrative schematic of a pixel 210 in accordance with an embodiment of the present disclosure. The pixel 210 may be coupled to a bitline 218, e.g., a readout column that provides image data to readout circuitry, such as the readout circuitry 106. In operation, the pixel 210 may receive control signals from control circuitry, such as the control circuitry 104, to control the operation of the various transistors of the pixel 210. The control circuitry may control the operation of the transistors in desired sequences with relative timing that assures an ordered read out of the image data.

The illustrated embodiment of the pixel 210 includes a photodiode (PD) 211, a floating diffusion (FD1) 213 connected to a capacitor (FDC) 219, a transfer transistor 212, a dual floating diffusion (DFD) transistor 216, a floating diffusion (FD2) 217 connected to a lateral overflow integration capacitor (LOFIC) 215, a reset (RST) transistor 214, a row select (RS) transistor 221, and a source follower (SF) transistor 220. The transfer (TX) transistor 212, which may also be referred to as a transfer gate 212, is coupled between the photodiode PD 211 and the floating diffusion FD1 213. The TX transistor 212 operates based on a TX control signal on its gate terminal. While the floating diffusion FD1 213 is depicted as connected to a capacitor FDC 219 that is connected to ground, the combination of FD1 213 and FDC 219 may also be collectively referred to as a floating diffusion.

The RST transistor 214 may be coupled to a reference voltage AVDD and may receive a reset control signal on its gate terminal. The additional capacitance LOFIC 215 may be coupled between a variable reference voltage VCAP and floating diffusion node FD2 217. The DFD transistor 216 may be coupled between FD1 213 and FD2 217, and further coupled to receive a DFD control signal on its gate terminal. Further, a gate terminal of the SF transistor 220 is coupled to floating diffusion node FD1 213. The source/drain terminals of the SF transistor are coupled between the reference voltage AVDD and the RS transistor. The RS transistor 221 may be coupled between the bitline 218 and the SF transistor 220.

In operation, the TX transistor 212 receives gate signal to enable charge transfer from the PD 211 to the floating diffusion FD1 213. In general, the amount of charge transfer depends on the light exposure of the PD 211 and operation of the pixel 210. The capacitor FDC 219 is illustrated as coupled to ground. In some embodiments, the FDC 219 may be formed by the metallization that is present in the physical layout of the device.

In some embodiments, LOFIC 215 may increase the storage, e.g., capacitance, of the floating diffusion FD2 217. For example, in response to high intensity illumination, the photodiode PD 211 may generate more charge than the floating diffusion FD1 213 can store. The extra charge may be stored by the LOFIC 215. In some embodiments, a reference voltage VCAP may modulate between two or more voltage levels (e.g., high voltage level "H" and low voltage level "L"), thus regulating how much charge is stored by the LOFIC 215. In general, the FDC 219 has a smaller capacitance than the LOFIC 215. Therefore, the floating diffusion FD1 213 is read in conjunction with the high conversion gain (HCG) part of the data readout, while the floating diffusion FD2 217 and floating diffusion 213 are read out in conjunction with the low conversion gain (LCG) part of the readout. Collectively, HCG and LCG readouts constitute a dual conversion gain (DCG) data readout.

In some embodiments, operation of the RST transistor 214 and the DFD transistor 216 may reset the floating diffusion FD1 213 to a high voltage that represents a dark state, because photogenerated electrons, when transferred to the floating diffusion FD1 213, decrease the voltage proportionally to the intensity of the PD 211 charge. To reset the floating diffusion FD1 213, both the RST transistor 214 and the DFD transistor 216 are enabled (ON) by their respective gate signals. In other embodiments, the RST transistor 214 may be in ON state, while the DFD transistor remains in OFF state, hence resetting the floating diffusion FD2 217, but not resetting the floating diffusion FD1 213.

The variable voltage VCAP coupled to the LOFIC 215 may be modulated between two or more voltage levels during an integration. In some embodiments, VCAP may be modulated between around 0.4V to around 1.8V. In other embodiments, other voltage levels may be implemented depending on the underlying semiconductor materials. The coupling of the FD2 217 to the FD1 213 when the DFD 216 is enabled may provide additional capacitance to store the charge generated by the PD 211. For example, when the TX 212 is enabled to transfer image charge to the floating diffusion FD1 213, the DFD 216 may be enabled to couple the additional capacitance LOFIC 215 to the floating diffusion FD1 213 to increase the full well capacity (FWC) of the floating diffusion. In some embodiments, the variable voltage VCAP may be at different voltages depending on whether the TX transistor 212 is enabled or disabled.

Figure 3:
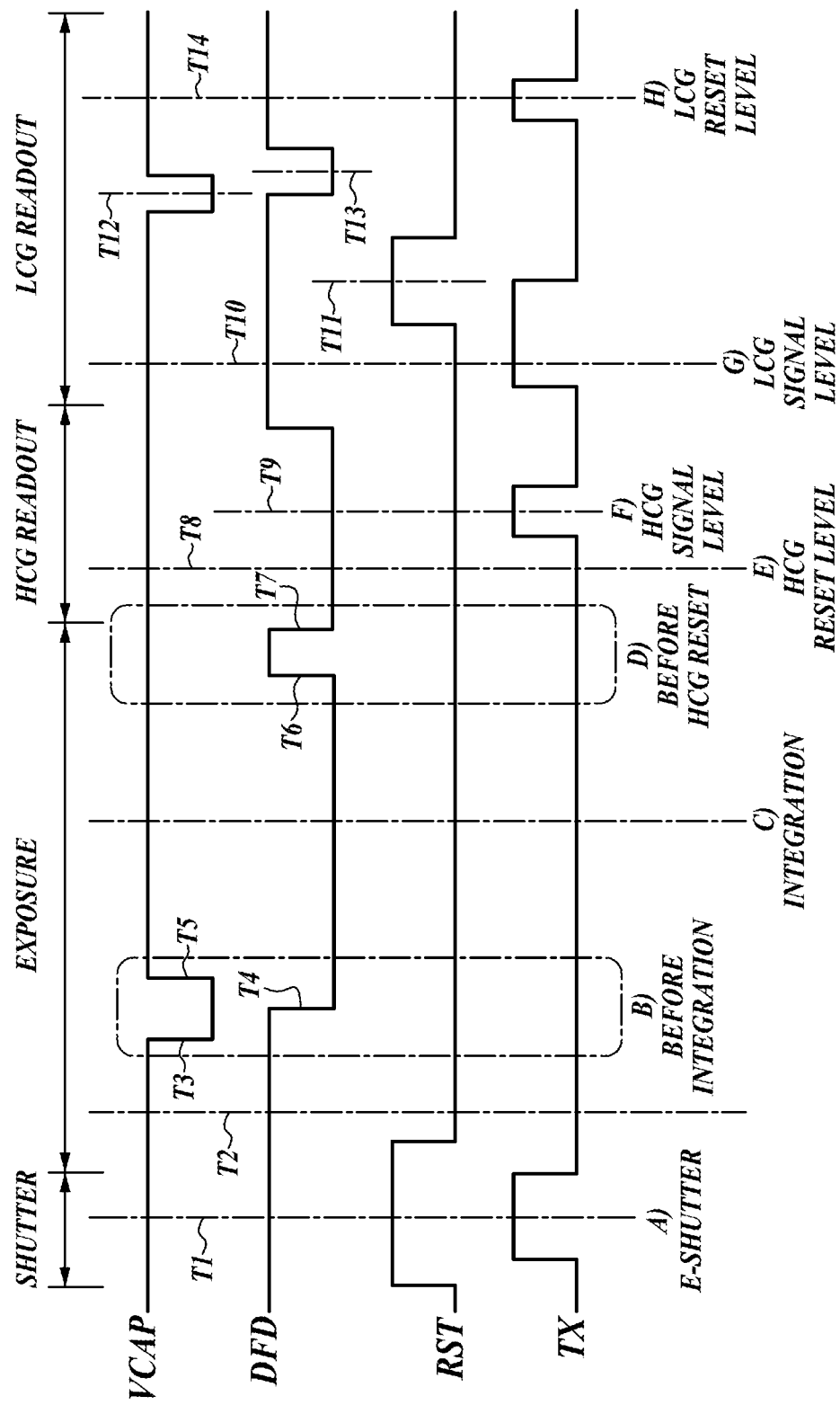
FIG. 3 is a timing diagram illustrating data readout in accordance with an embodiment of the present disclosure.

FIG. 3 is a timing diagram illustrating data readout in accordance with an embodiment of the present disclosure. The four vertically stacked signal diagrams represent from top to bottom the VCAP voltage and the gate voltages for the TX, RST, DFD transistors. Along the horizontal timeline, the illustrated timing diagram captures four time segments: shutter, exposure, high conversion gain (HCG) readout and low conversion gain (LCG) readout (listed on the top of the diagram).

Briefly, during the shutter period both the TX and the RST signals are executed, resulting in the floating diffusions FD1 and FD2 being charged to their high positive voltage potential (i.e., the voltage corresponding to no light exposure). During the exposure period, the PD 211 accumulates charges generated by the light exposure. During the HCG and LCG readouts, the charges generated by the PD are accumulated at the FDC (corresponding to the HCG) and LOFIC (corresponding to the LCG). These HCG and LCG charges are next read, collectively constituting a dual conversion gain (DCG) readout.

The timing diagram includes the times T1-T14 described below. During the shutter period (time T1), an electronic shutter ("A) E-SHUTTER") is executed by enabling the DFD, RST and TX gates to ON state. As a result, the floating diffusions FD1 and FD2 are set to positive voltage AVDD, flushing the charge that may have accumulated in the FD1 and FD2 (and also flushing the charge storage accumulated in the FDC and LOFIC).

Timing events T3-T5 mark the signals executed during the "B) BEFORE INTEGRATION" period. Here, since the TX remains OFF, no charge should be accumulating at the floating diffusions FD1 and FD2 (and their corresponding capacitors FDC and LOFIC). However, dark current may still be generated by the pixel 210, therefore charge may be flowing from the PD 211 toward the FD1 and FD2. At time T3, the VCAP is set to a low voltage (L). When the DFD gate is set to OFF at time T4, the DFD transistor isolates the floating diffusion FD1 from the floating diffusion FD2, both of which are still at their low values based on the preceding RST and TX events.

At time T5, the VCAP is raised back to high value (H). In at least some embodiments, keeping the VCAP at high value between the "B) BEFORE INTEGRATION" and "D) BEFORE RESET" events increases the capacity of the LOFIC. It is appreciated that the illustrated timing diagram is not necessarily drawn on scale. For example, a duration of time between the times T5 and T6 (integration) may be relatively long in comparison to other periods of time. Generally, high FD2 voltage induces high dark current (DC) and white pixel (WP) at FD2 junction node. To reduce this relatively high DC and WP at FD2, low leakage DFD and RST transistors are needed. In this timing, FD1 voltage is decreased during the integration, which reduces DC/WP at FD1. This is because DC/WP at FD1 is larger than DC/WP at FD2 since the voltage difference between FD1 and TX gate is larger than others due to the negative bias of the TX gate. As a result, the pixel accuracy levels that are affected by dark current/white pixel may be at least partially mitigated. In some embodiments, high value of VCAP voltage may correspond to AVDD (i.e., power supply) voltage.

During the "D) BEFORE HCG RESET" event, VCAP voltage is kept constant, which keeps the capacitance of the LOFIC constant. At time T6, the DFD transistor 216 is set to ON, therefore equalizing the potentials at FD1 and FD2. Next, at time T7, the DFD transistor is set to OFF for the HCG reset operation.

In some embodiments, the correlated double sampling (CDS) readout is executed as follows. During the "E) HCG RESET LEVEL" event, the DFD transistor 216 is set to OFF at time T7, therefore isolating the floating diffusion FD1 from the floating diffusion FD2. Next, another HCG readout ("F) HCG SIGNAL LEVEL") is executed by reading the HCG signal level through the FDC readout. The HCG readout includes reading the HCG reset level while the TX transistor is in its OFF position at time T8, followed by reading the HCG signal level while the TX transistor is in its ON position at time T9. Next, the LCG readout ("G) LCG SIGNAL LEVEL") is obtained by reading the charge of the LOFIC. The LCG readout includes reading the LCG signal level while the TX transistor is ON at time T10. At time T11, the RST transistor is in its ON position, thus flushing the charge at the FD1 and FD2 as explained above. At time T12 the VCAP voltage is again set to low, thus, as explained above, decreasing the capacitance of the LOFIC 215. At time T13 the DFD gate is OFF, thus isolating the floating diffusion FD1 from the floating diffusion FD2 as explained above. With this timing, dark signal level at the reset time corresponds to dark signal levels when LCG signal is read. Collectively, the HCG and LCG readouts represent a dual conversion gain (DCG) readout. At time T14 ("H) LCG RESET LEVEL"), the DFD gate is set to ON. As a result, the floating diffusions FD1 and FD2 are at the same voltage potential, which corresponds to the LCG reset level.

FIGS. 4-11 are energy potential diagrams illustrating phases of data readout in accordance with embodiments of the present disclosure. In each diagram, vertical axis represents the potential levels (voltage levels), whereby positive voltage increases from the top of the diagram toward the bottom of the diagram. Therefore, a higher accumulation of electrons (negative charge) acts to raise the energy potential toward the top of the diagram. Different components (e.g., PD, TX, FD1, DFD, etc.) of the pixel circuit are arranged horizontally along the potential diagrams. Numbers 1, 2, 3 represent different steps during the illustrated phase of data readout. For example, step 1 may correspond to a time Tn when, for instance, the DFD transistor was opened. As another example, step 3 may correspond to a time Tm when the VCAP was increased. Of course, scenarios other than the above sample scenarios also exist, as explained below with reference to specific figures.

Figure 4:
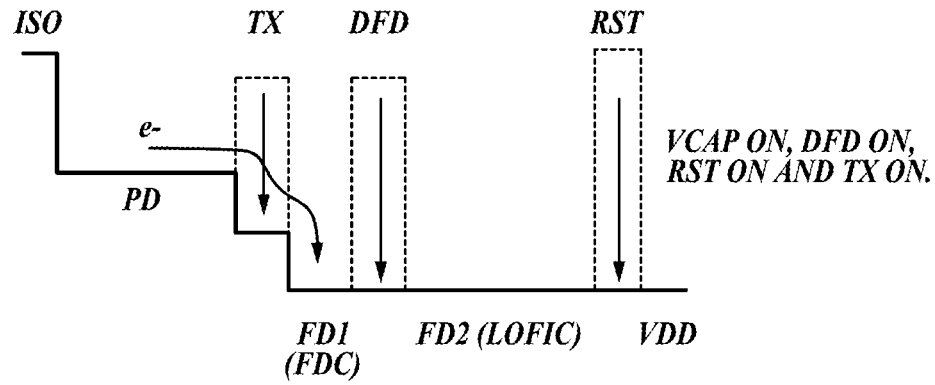
FIGS. 4-11 are energy potential diagrams illustrating phases of charge accumulation and data readout in accordance with embodiments of the present disclosure.

FIG. 4 corresponds to the "A) E-SHUTTER" event of FIG. 3. At this time, the TX, DFD and RST transistors are on (also referred to as high or ON), therefore FD1 and FD2 are brought to the potential VCAP (also referred to as VDD). As explained above, the e-shutter event flushes the charges of the floating diffusions FD1 and FD2.

Figure 5:
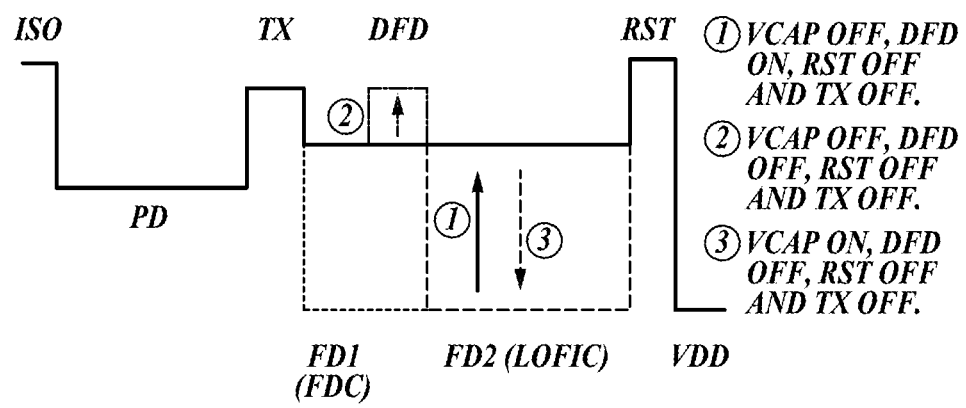

FIG. 5 corresponds to the "B) BEFORE INTEGRATION" event of FIG. 3. Step 1 signifies setting the VCAP to a low value (corresponding to time T3 in FIG. 3). As a result, the capacitance of the LOFIC is reduced. Step 2 signifies setting the DFD transistor to off (open or OFF position at time T4 in FIG. 3), which isolates the floating diffusion FD1 from the floating diffusion FD2. Therefore, setting the VCAP to a high value in step 3 (time T5 in FIG. 3) increases the capacitance of the LOFIC, but does not affect the capacitance of the FDC. As explained above, high FD2 voltage induces high dark current (DC) and white pixel (WP) at FD2 junction node. To reduce this relatively high WP and DC at FD2, low leakage DFD and RST transistors are needed.

Figure 6:
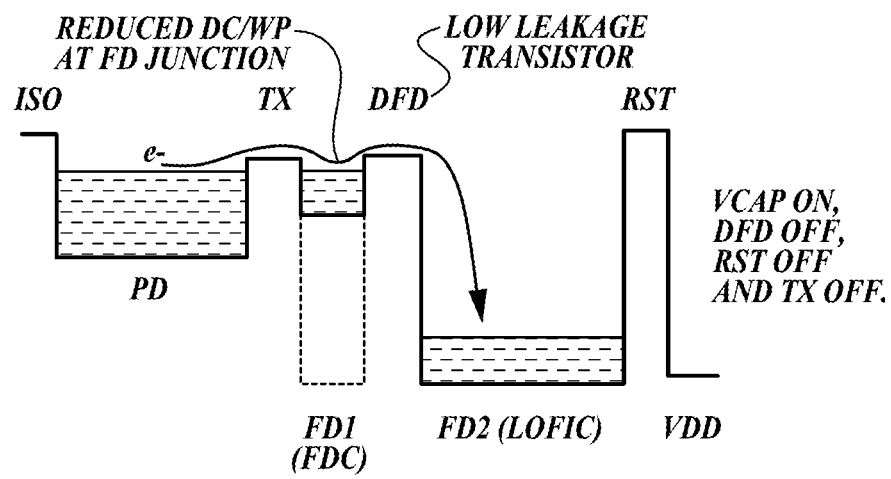

FIG. 6 corresponds to the "C) INTEGRATION" period of FIG. 3. The "integration" refers to process where the PD generates charges, but the readout has not started yet. As explained above, since the VCAP is at a high value, the capacitance of the LOFIC is also high, but the capacitance of the FDC remains relatively low because the VCAP is not felt at the floating diffusion FD1 due to the DFD transistor being in the OFF state. In the illustrated diagram, FD1 voltage is decreased during the integration, which reduces DC/WP at FD1. This is because DC/WP at FD1 is larger than DC/WP at FD2 since the voltage difference between FD1 and TX gate is larger than others due to the negative bias of the TX gate.

In some embodiments the DFD and RST transistor may be a low leakage transistor to further suppress the dark current and/or white pixel issues at the floating diffusion FD2. In many situations, the "C) INTEGRATION" process is relatively long in comparison with the "B) BEFORE INTEGRATION" that precedes it and in comparison with the "D) BEFORE HCG RESET" that follows afterward. Therefore, it is appreciated that the timing diagram shown in FIG. 3 is not necessarily shown on scale.

Figure 7:
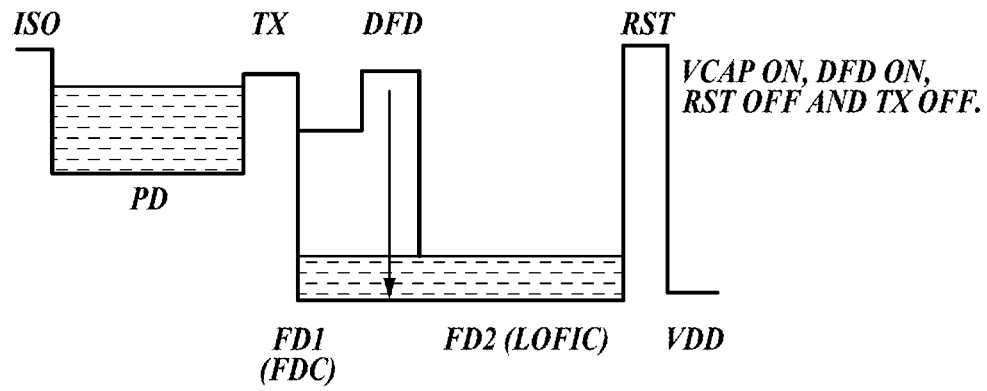
Figure 8:
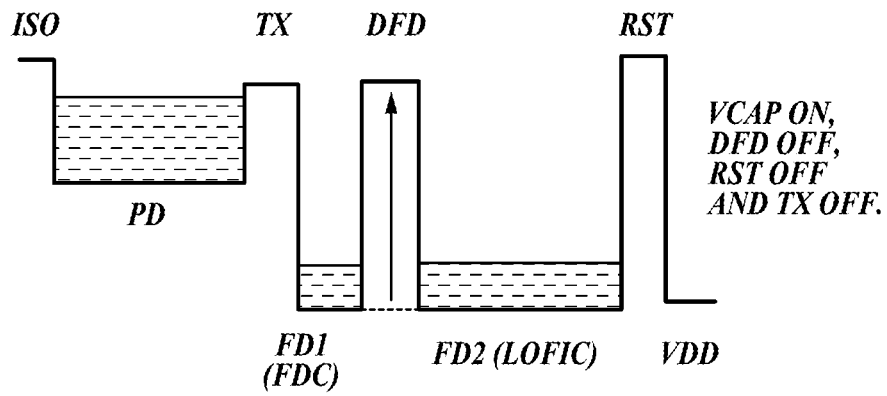

FIG. 7 corresponds to the "D) BEFORE HCG RESET" event of FIG. 3. Here, the integration process where the PD generates charges is almost complete, and the process is getting close to the DCG readout (i.e., the subsequent combined HCG and LCG readouts). Here, the VCAP is kept constant, which keeps the capacitance of the LOFIC constant The DFD transistor is set to ON (time T6 in FIG. 3), which electrically connects the floating diffusion FD1 with the floating diffusion FD2, thus equalizing the potentials of FD1 and FD2. FIG. 8 corresponds to the "E) HCG RESET LEVEL" event of FIG. 3. Here, a first part of the HCG conversion is accomplished by setting the DFD transistor to off, therefore separating the floating diffusion FD2 from the floating diffusion FD1 to enable a readout of the FDC at the high conversion gain (HCG) reset level. At this point the TX transistor remains OFF, therefore charges accumulated by the PD are still not flowing toward FD1 and FD2.

Figure 9:
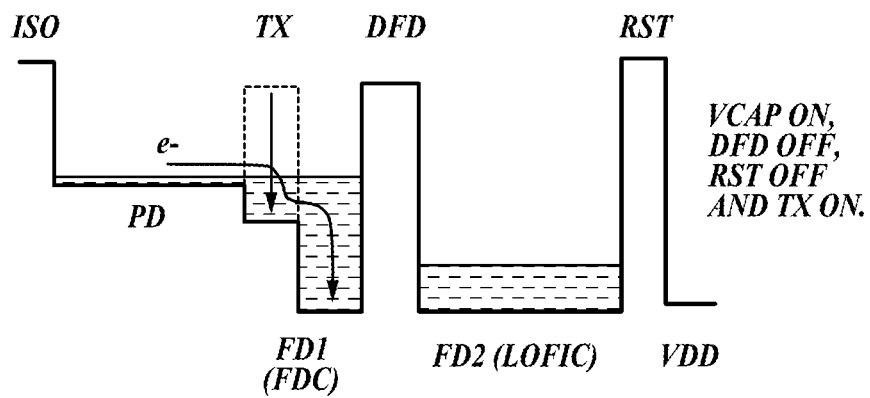

FIG. 9 corresponds to the "F) HCG SIGNAL LEVEL" event of FIG. 3. Here, a second part of the HCG conversion is accomplished by setting the TX transistor to on, therefore allowing the flow of charge from the PD to the floating diffusion FD1 for a readout of the HCG signal level. The DFD transistor remains OFF, therefore charges accumulated by the PD are still not flowing from the FD1 to the FD2.

Figure 10:
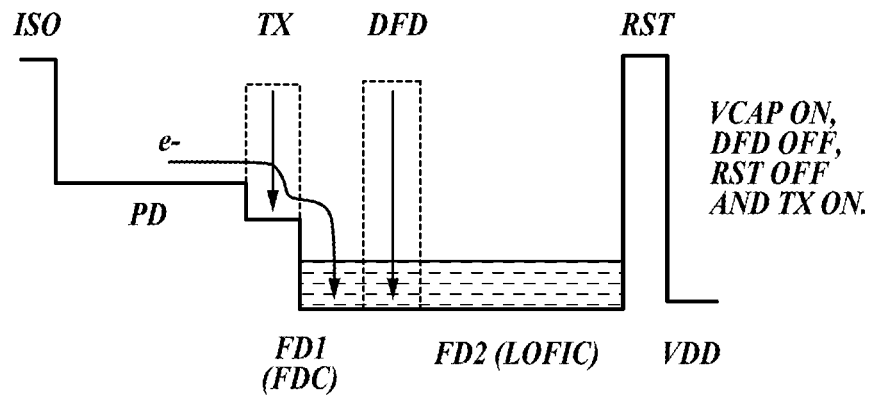

FIG. 10 corresponds to the "G) LCG SIGNAL LEVEL" event of FIG. 3. Here, a first part of the LCG conversion is accomplished by setting the DFD transistor to on, therefore allowing the flow of charge from the PD and FD1 to the floating diffusion FD2 for the subsequent readout of the LCG signal level.

Figure 11:
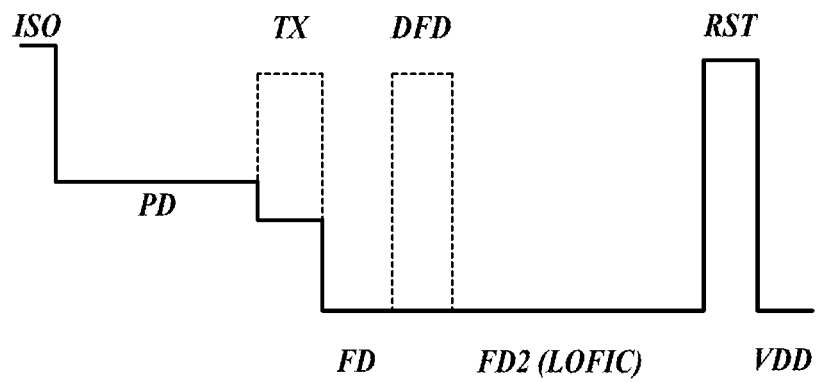

FIG. 11 corresponds to the "H) LCG RESET LEVEL" event of FIG. 3. Here, LCG dark signal level at the reset time corresponds to dark signal levels when LCG signal is read. To relate LCG dark signal levels between reset time and signal read, pixel timing A), B), D) and G) are repeated for LCG reset operation. Collectively, the HCG and LCG readouts represent a dual conversion gain (DCG) readout. At time T14, the DFD gate is set to ON. As a result, the floating diffusions FD1 and FD2 are at the same voltage potential, which corresponds to the LCG reset level.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method for a correlated double sampling (CDS) readout of an image sensor having a plurality of pixels of a pixel array,
   wherein each pixel comprises a photodiode (PD), a first floating diffusion (FD1) coupled to the photodiode through a transfer (TX) transistor, a second floating diffusion (FD2) coupled to the FD1 through a dual floating diffusion (DFD) transistor, and a lateral overflow integrating capacitor (LOFIC) coupled between the FD2 and a variable reference voltage (VCAP),
   the method comprising:
     exposing a photodiode (PD) to light during an exposure period;
     increasing a capacitance of the LOFIC by setting the VCAP to a high voltage (H) level during an integration period of the exposure period;
     prior to setting the VCAP to the H level during the exposure period, electrically disconnecting the FD1 from the FD2 by setting the DFD to an OFF state while the capacitance of the LOFIC is reduced by the VCAP being set to a low voltage (L) level;

after setting the DFD to the OFF state during the exposure period, setting the VCAP to the H level;

after setting the VCAP to the H level, electrically connecting the FD1 with the FD2 by setting the DFD to an ON state; and after setting the VCAP to the H level during the exposure period, setting the VCAP to the L value during a low conversion gain (LCG) readout.

2. The method of claim 1, further comprising:
reducing a dark current and an occurrence of white pixel by setting the VCAP to the L level.

3. The method of claim 1, further comprising:
reading charges accumulated in the LOFIC and a floating diffusion capacitor (FDC) of the FD1 during a dual conversion gain (DCG) period.

4. The method of claim 3, wherein the FDC is coupled between the FD1 and a ground potential.

5. The method of claim 3, wherein the H voltage level of the VCAP corresponds to a power supply voltage (AVDD).

6. The method of claim 1, wherein a DCG period comprises:
an HCG reset readout;
an HCG signal readout after the HCG reset readout;
an LCG signal readout after the HCG signal readout; and
an LCG reset level after the LCG signal readout.

7. The method of claim 1, wherein the DFD transistor is a low leakage transistor.

8. The method of claim 1, wherein a reset (RST) transistor is a low leakage transistor.

9. An image sensor, comprising:
a plurality of pixels arranged in rows and columns of a pixel array, each pixel comprising:
a photodiode (PD);
a first floating diffusion (FD1) connected to the photodiode through a transfer (TX) transistor;
a second floating diffusion (FD2) connected to the FD1 through a dual floating diffusion (DFD) transistor; and
a lateral overflow integrating capacitor (LOFIC) coupled between the FD2 and a variable reference voltage (VCAP),
wherein the PD is configured to generate electrical charge during an exposure period, wherein the VCAP is set to a high voltage (H) level during the exposure period, and wherein, after setting the VCAP to the H level during the exposure period, a capacitance of the LOFIC is decreased by setting the VCAP to a low voltage (L) level during a low conversion gain (LCG) readout.

10. The image sensor of claim 9, further comprising a floating diffusion capacitor (FDC) coupled between the FD1 and an electrical ground.

11. The image sensor of claim 10, wherein a dark current and an occurrence of white pixel at the FD1 is reduced by decreasing voltage at the FD1.

12. The image sensor of claim 9, wherein the capacitance of the LOFIC is increased by setting the VCAP voltage to the H level during the integration period.

13. The image sensor of claim 12, wherein a dark current and an occurrence of white pixel at the FD2 is reduced by using a low leakage transistor for the DFD transistor.

14. The image sensor of claim 13, wherein a reset (RST) transistor is a low leakage transistor.

* * * * *